(12) United States Patent
Bowman et al.

(10) Patent No.: US 11,806,921 B2
(45) Date of Patent: Nov. 7, 2023

(54) SYSTEM AND METHOD FOR RETROACTIVELY LINING A VERTICAL TRASH CHUTE

(71) Applicant: US Chute Lining, LLC, Langhorne, PA (US)

(72) Inventors: Jeremy R. Bowman, Langhorne, PA (US); Ford C. Bowman, Langhorne, PA (US)

(73) Assignee: US Chute Lining, LLC, Langhorne, PA (US)

( * ) Notice: Subject to any disclaimer, the term of this patent is extended or adjusted under 35 U.S.C. 154(b) by 401 days.

(21) Appl. No.: 17/076,751

(22) Filed: Oct. 21, 2020

(65) Prior Publication Data

US 2022/0118679 A1    Apr. 21, 2022

(51) Int. Cl.
| | | |
|---|---|---|
| *B29C 63/00* | (2006.01) | |
| *B65G 11/00* | (2006.01) | |
| *B29C 63/34* | (2006.01) | |
| *B65G 11/02* | (2006.01) | |

(52) U.S. Cl.
CPC ........ *B29C 63/346* (2013.01); *B29C 63/0017* (2013.01); *B65G 11/023* (2013.01)

(58) Field of Classification Search
CPC ... B29C 63/00; B29C 63/001; B29C 63/0017; B29C 63/30; B29C 63/34; B29C 63/346; B65G 11/00; B65G 11/02; B65G 11/023
See application file for complete search history.

(56) References Cited

U.S. PATENT DOCUMENTS

| | | | |
|---|---|---|---|
| 3,946,459 A | 3/1976 | Armstrong | |
| 4,071,919 A | 2/1978 | Fields et al. | |
| 4,490,876 A | 1/1985 | Haberl | |
| 4,846,147 A | 7/1989 | Townsend et al. | |
| 5,762,083 A * | 6/1998 | Bate | B08B 9/043 134/201 |
| 6,539,979 B1 | 4/2003 | Driver | |
| 6,708,728 B2 | 3/2004 | Driver et al. | |
| 7,089,642 B2 * | 8/2006 | Grata | B65G 11/166 29/402.09 |
| 7,360,559 B2 | 4/2008 | Driver et al. | |
| 9,453,597 B2 * | 9/2016 | Delaney | F16L 9/14 |
| 2005/0016450 A1 | 1/2005 | Smith et al. | |
| 2007/0113971 A1 | 5/2007 | Driver et al. | |

\* cited by examiner

*Primary Examiner* — Jacob T Minskey
*Assistant Examiner* — Matthew Hoover
(74) *Attorney, Agent, or Firm* — LaMorte & Associates P.C.

(57) ABSTRACT

A system and method of retroactively lining a vertical trash chute in a building. A tubular fabric liner is provided having a first open end and a second open end. The tubular fabric liner is infused with a resin. A first plug assembly is attached to the first open end. The tubular fabric liner is pulled through the vertical trash chute to position the tubular fabric liner in the trash chute. A second plug assembly is attached to the second open end. The tubular fabric liner is inflated. As it expands, the tubular fabric liner presses against the interior of the trash chute. This condition is maintained until the resin cures and bonds the tubular fabric liner to the trash chute. Once cured, the plug assemblies are removed, the tubular fabric liner is trimmed, and trash chute access openings are cut through the cured liner.

13 Claims, 7 Drawing Sheets

SYSTEM AND METHOD FOR RETROACTIVELY LINING A VERTICAL TRASH CHUTE

BACKGROUND OF THE INVENTION

1. Field of the Invention

In general, the present invention relates to lining systems that are used to retroactively line various conduits. More particularly, the present invention relates to lining systems that can be used to lined thin-walled conduits, such as trash chutes, that are vertically oriented.

2. Prior Art Description

Many office buildings and apartment buildings have trash chutes. Trash chutes, sometimes called garbage chutes, were originally used to drop rubbish down to the basement of a building for incineration. Over time, many regulations have been emplaced that regulate the treatment and disposal of trash. These regulations, along with air quality environmental regulations, have all but ended in-building incineration. Instead, building incinerators have been replaced with commercial trash compactors. The trash chute feeds the trash compactor. When the trash compactor is full, the trash compactor is cycled. The compacted trash is then placed into a dumpster for disposal by a waste collection department or company.

Although compactors have replaced incinerators, little change has come to the trash chute. Bags of trash still fall through the trash chute and into a building's basement. As a bag of trash falls through a trash chute, it contacts various surfaces. This often causes the bag of trash to tear. Additionally, trash is often thrown down the trash chute that is not bagged. Trash chutes can also become clogged, when multiple bags are placed into the chute at the same time or when oversized trash, such as pizza boxes, are forced into the chute. All these activities cause raw garbage to back up and contact the interior surfaces of the trash chute. Over time the interior of the trash chute becomes highly contaminated with bacteria and fungus. This causes noxious odors and attracts both insects and vermin.

Trash chutes have many openings and are not intended to be internally pressurized. Rather, trash chutes are only intended to guide falling bags of trash. As a result, most trash chutes are thin-walled conduits that are primarily made of thin sections of sheet metal. The sections of sheet metal are typically held together using sheet metal screws. The segmented pieces of interconnected sheet metal prevent the trash chute from being pressurized to any significant degree without the sheet metal bending or a seam splitting. Furthermore, due to contact damage and the buildup of contaminants, it is not unusual for the metal wall of the trash chute to rust and wear. Over time, openings can form in the walls of the trash chute that enable contamination to escape the trash chute and get into a wall cavity. This causes perpetual odor and will inevitably cause an insect and/or vermin infestation.

Trash chutes are built between walls within a building. As such, in order to repair a damaged trash chute, a large opening typically must be cut into a wall adjacent to the point of repair. This is expensive, labor intensive, and impractical in many situations. As such, many building owners pay a cleaning service to periodically clean and maintain trash chutes. This maintenance is typically performed by lowering a cleaning brush and/or spray head down the trash chute to brush and/or wash away contamination. Such prior art systems are exemplified by U.S. Pat. No. 4,071,919 to Fields and U.S. Pat. No. 5,762,083 to Bate.

Even if a trash chute is periodically cleaned, nothing last forever. Metal rusts, seams open and damage occurs. For example, even the best maintained trash chute can be damaged by a person who throws away a heavy object, such as a brick, or a ceramic flowerpot. As a result, a trash chute will eventually need repair. In the prior art, systems exist for lining vertical chutes such as chimneys. Such prior art is exemplified by U.S. Pat. No. 4,846,147 to Townsend. However, chimneys are generally much stronger, shorter, and narrower than trash chutes. As such, these prior art systems cannot be adapted for use in garbage chutes, for a variety of reasons. Chimney lining systems requires internal pressurization or the use of cement lining fill. Both systems would deform and split the thin sheet metal of a trash chute. Chimney lining systems significantly decrease the open area within the chute and/or adds so much weight that the mounting brackets of the trash chute are incapable of holding the weight of the lining system.

Lining systems for large conduits, such as pipelines, are designed assuming that the pipeline is generally horizontal and that the weight of the lining system is not a relevant concern. These types of lining systems are also installed using high installation pressures to advance the liner through the pipeline. Such prior art lining systems are exemplified by U.S. Pat. No. 7,360,559 to Driver and U.S. Pat. No. 6,539,979 to Driver. Pipeline pipe is made of thick-walled steel that is capable of containing high internal pressures. Trash chutes cannot hold pressure and are far less strong. As such, pipeline liner systems cannot simply be applied to a vertical trash chute because the pressures used to install pipeline liners would explode the thin construction of a trash chute. Furthermore, the vertical orientation of a long trash chute that is several stories high, would cause the liner to fold and wrinkle under the forces of its own weight.

A need therefore exists for a lining system that is specially designed for vertically oriented trash chutes, wherein the lining system is low cost, light weight and capable of being installed at low pressures. This need is met by the present invention as described and claimed below.

SUMMARY OF THE INVENTION

The present invention is a system and method of retroactively lining the interior of a vertical trash chute in a building. To line the trash chute, a tubular fabric liner is provided. The tubular fabric liner has a first open end and a second open end. Furthermore, the tubular fabric liner is infused with a resin.

A first plug assembly is attached to the first open end of the tubular fabric liner. Using the first plug assembly, the first open end of the tubular fabric liner is pulled through the length of the vertical trash chute. This positions the tubular fabric liner in the vertical trash chute.

A second plug assembly is attached to the second open end of the tubular fabric liner. The tubular fabric liner is therefore sealed at its two open ends. The tubular fabric liner is then inflated within the confines of the trash chute. This expands the tubular fabric liner. As it expands, the tubular fabric liner presses against the interior of the trash chute. This condition is maintained until the resin cures and bonds the tubular fabric liner to the interior of the trash chute. Once cured, the plug assemblies are removed, the tubular fabric liner is trimmed, and trash chute access openings are cut through the cured liner. The trash chute is now lined and functional.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention trash chute lining system and method can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered a limitation when interpreting the scope of the appended claims.

Figure 1:
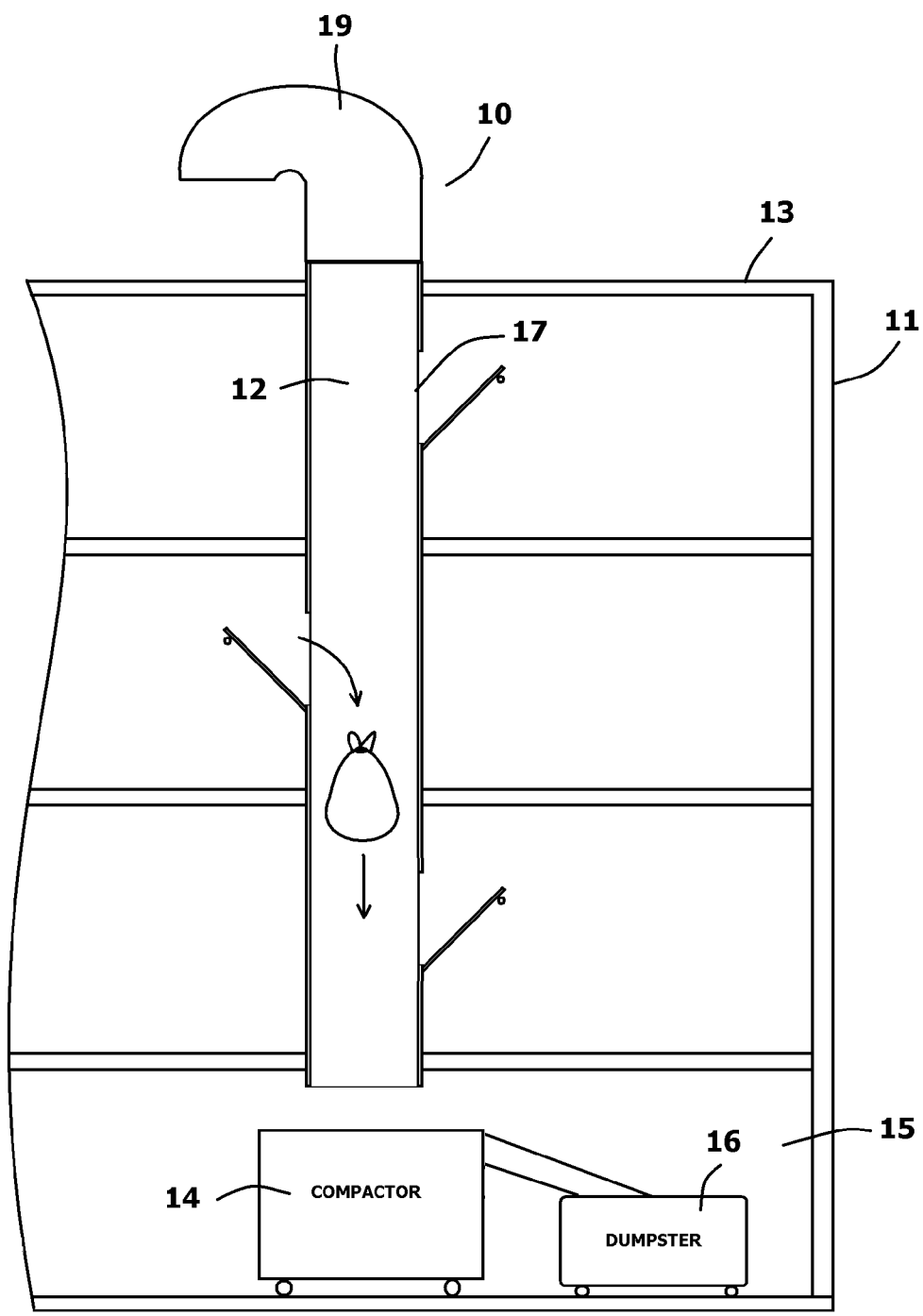
FIG. 1 is a schematic showing an exemplary trash chute prior to undergoing a retroactive lining procedure.

Referring to FIG. 1, an exemplary trash disposal system 10 for a building 11 is shown. The trash disposal system 10 includes a trash chute 12 made from interconnected sections of thin-walled sheet metal ductwork. Accordingly, should the trash chute 12 be pressurized, it would have a low rupture pressure and an even lower deformation pressure. The trash chute 12 extends vertically from the roof 13 of the building 11 to the basement 15 of the building 11. The trash chute 12 typically has a circular, square, or rectangular cross-sectional profile.

The building 11 has multiple floors. An access opening 17 is provided on each floor for throwing trash into the trash chute 12. On the roof 13 of the building 11, the trash chute 12 is typically covered with a fitted vent cover 19. The vent cover 19 vents odors from the trash chute 12 while keeping out rain and animals. In the basement 15, the trash chute 12 is open. Below the trash chute 12 is typically a trash compactor 14 that compacts any trash that falls through the trash chute 12. The compactor 14 then forwards the compacted trash into a dumpster 16 for removal.

Figure 2:
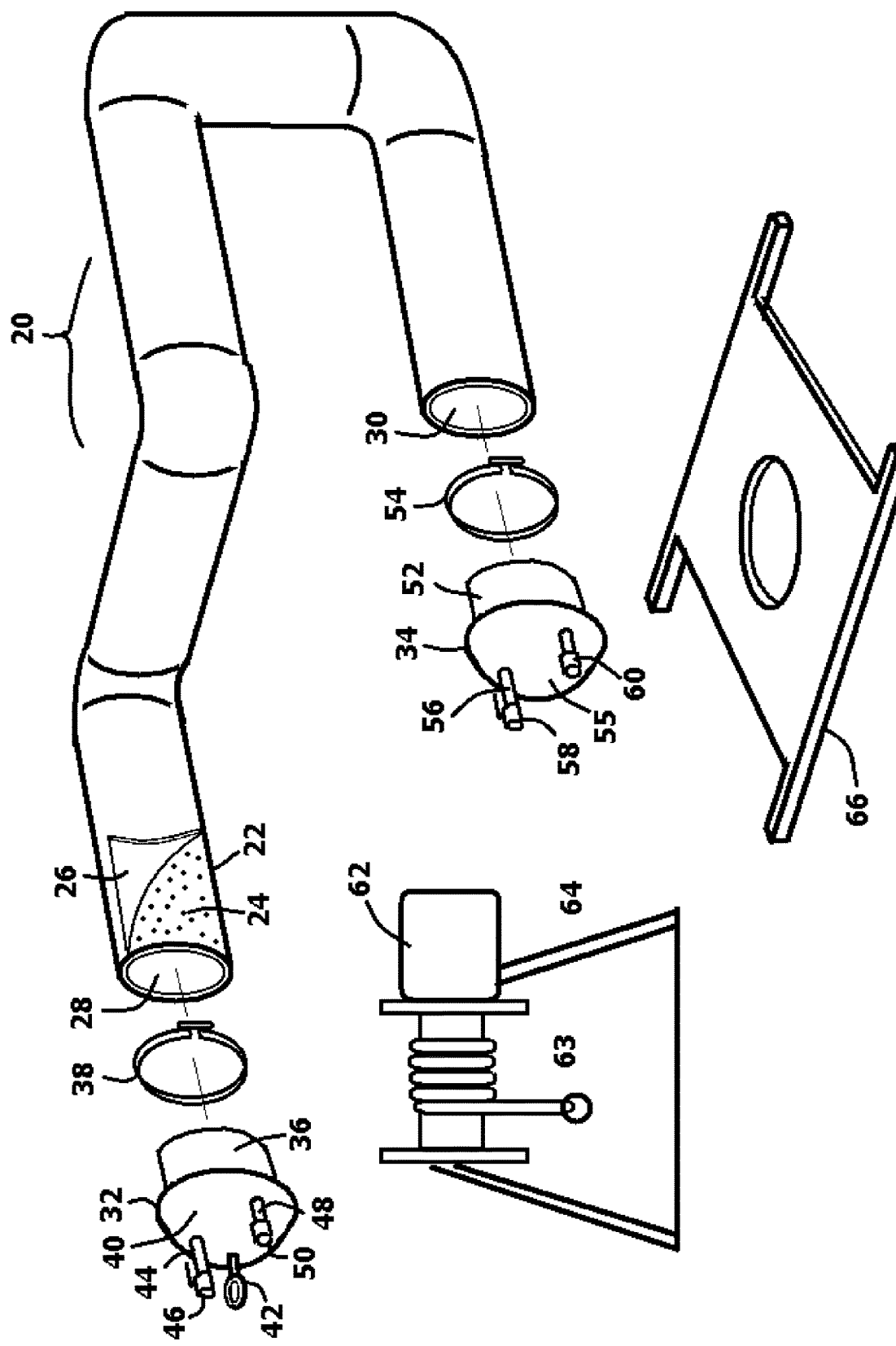
FIG. 2 shows the primary components of a lining system.

Referring to FIG. 2, it can be seen that the present invention lining system 20 includes a tubular fabric liner 22. The tubular fabric liner 22 is made of synthetic fibers, such as poly paraphenylene terephthalamide, that have a high tensile strength, low weight and are hydrophobic. Other synthetic polymer fibers, such as high-density polyethylene fibers, can also be used. Such fibers can be mixed with glass fibers and other compounds to make the tubular fabric liner 12 more fire resistant. Antimicrobial agents, such as alkaline copper quaternary, copper naphthenate, and chromated copper arsenate can also be used to treat the fibers of the tubular fabric liner 22. Such antimicrobial agents prevent the decomposition of the synthetic fibers and inhibit the growth of bacteria and mold on and within the fibers.

The tubular fabric liner 22 is infused with a heat activated resin 24. Preferably the heat activated resin 24 is inorganic and cures at a temperature above 150 degrees Fahrenheit and below 205 degrees Fahrenheit. The heat activated resin 24 remains uncured at room temperature and pressure. To prevent contamination of the uncured resin 24, the tubular fabric liner 22 is covered in a removable protective film 26 that is removed only as the tubular fabric liner 22 is advanced into the trash chute 12.

The trash chute 12 has a cross-sectional shape with an internal circumference or perimeter length, depending on whether the shape is circular or polygonal. The tubular fabric liner 22 has an exterior circumference or perimeter length that equals or closely matches that of the trash chute 12. In this manner, the tubular fabric liner 22 can adhere to all of the internal surfaces of the trash chute 12 without any significant buckles, folds, or gaps. The tubular fabric liner 22 is thin. As such, the tubular fabric liner 22 has inner dimensions that are only slightly smaller than its outer dimensions. The tubular fabric liner 22 is cut to be slightly longer than the length of the trash chute 12. The internal and external shape of tubular fabric liner 22 remains constant along its length between with a first open end 28 and an opposite second open end 30.

Two plug assemblies 32, 34 are provided. The first plug assembly 32 is configured to terminate the first open end 28 of the tubular fabric liner 22. The first plug assembly 32 has a tube section 36 that is sized to fit into the interior of the tubular fabric liner 22 through the first open end 28. The tube section 36 of the first plug assembly 32 has the same geometric shape as the cross section of the tubular fabric liner 22. That is, if the tubular fabric liner 22 is circular, the tube section 36 of the first plug assembly 32 is also circular. In this manner, the first open end 28 of the tubular fabric liner 22 can pass over the tube section 36 without creating any folds or buckles in the tubular fabric liner 22. The tube section 36 is advanced into the first open end 28 of the tubular fabric liner 22. A clamp 38 is provided to temporarily clamp the tubular fabric liner 22 onto the tube section 36 of the first plug assembly 32. The interconnection between the tubular fabric liner 22 and the first plug assembly 32 should be airtight after clamping.

The first plug assembly 32 has an endcap 40 that seals the tube section 36. An eye loop or similar cable connector 42 is provided on the endcap 40 that is in-line with the center of gravity for the overall first plug assembly 32. The first plug assembly 32 further includes a vent pipe 44 that extends through the endcap 40. The vent pipe 44 can be selectively opened and closed using a vent valve 46. Furthermore, a pressure relief pipe 48 with a pressure relief valve 50 are also provided on the endcap 40 for a purpose that is later described.

The second plug assembly 34 is configured to terminate the second open end 30 of the tubular fabric liner 22. The second plug assembly 34 has a tube section 52 that is sized to fit into the interior of the tubular fabric liner 22 through its second open end 30. The tube section 52 of the second plug assembly 34 has the same geometric shape as the cross section of the tubular fabric liner 22. The tube section 52 is advanced into the second open end 30 of the tubular fabric liner 22. A second clamp 54 is provided to temporarily clamp the tubular fabric liner 22 onto the tube section 52 of the second plug assembly 34.

The second plug assembly 34 has an endcap 55 that seals the tube section 52. A steam port 56 is provided through the endcap 55 that can be selectively opened and closed with a fill valve 58. Furthermore, a second pressure release valve 60 is mounted to the endcap 55 for a purpose that is later described.

A winch 62 and winch stand 64 are provided. The winch 62 raises and lowers a cable 64. The winch stand 64 is sized and configured to hold the cable 63 from the winch 62 over the center of the trash chute 12 from the roof 13 of the building 11.

A support plate 66 is provided. The support plate 66 is a rigid structure that is designed to mount over the bottom of the trash chute 12 in the basement 15. The purpose of the support plate 66 is later described.

Figure 3:
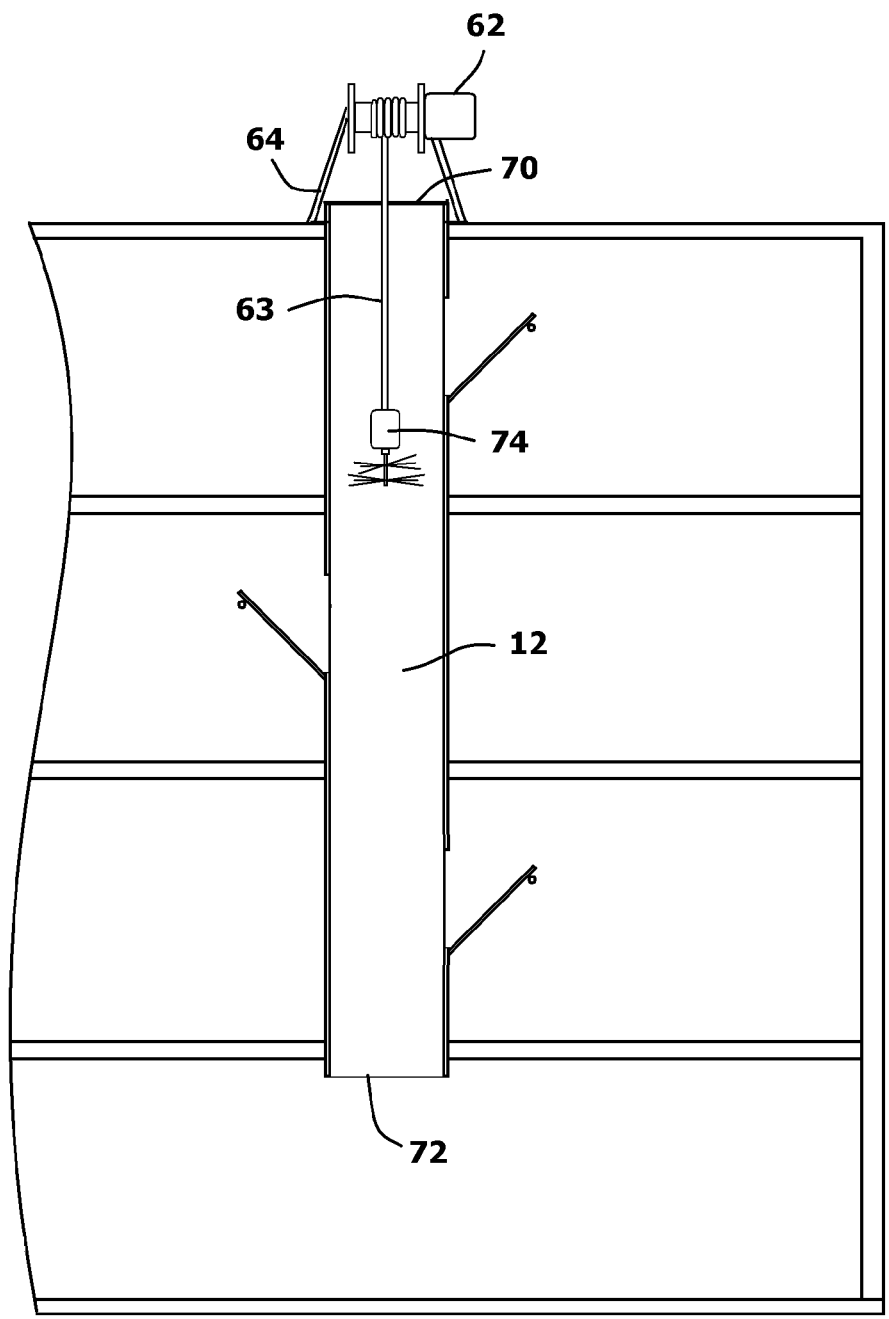
FIG. 3 shows the exemplary trash chute of FIG. 1 undergoing an initial cleaning procedure.

Referring to FIG. 3 in conjunction with FIG. 2 and FIG. 1, the method of installing the lining system 20 is described. Initially, the trash chute 12 is prepared for the installation. The roof vent cover 19 is removed, therein exposing the open top 70 of the trash chute 12. Likewise, the trash compactor 14 and dumpster 16 are moved to expose the open bottom 72 of the trash chute 12. The winch 62 and winch stand 64 are installed over the open top 70 of the trash chute 12. This positions the cable 63 over the center of the trash chute 12. A prior art cleaning system 74 is lowered through the trash chute 12 to brush and/or wash the trash chute 12 until clean.

Figure 4:
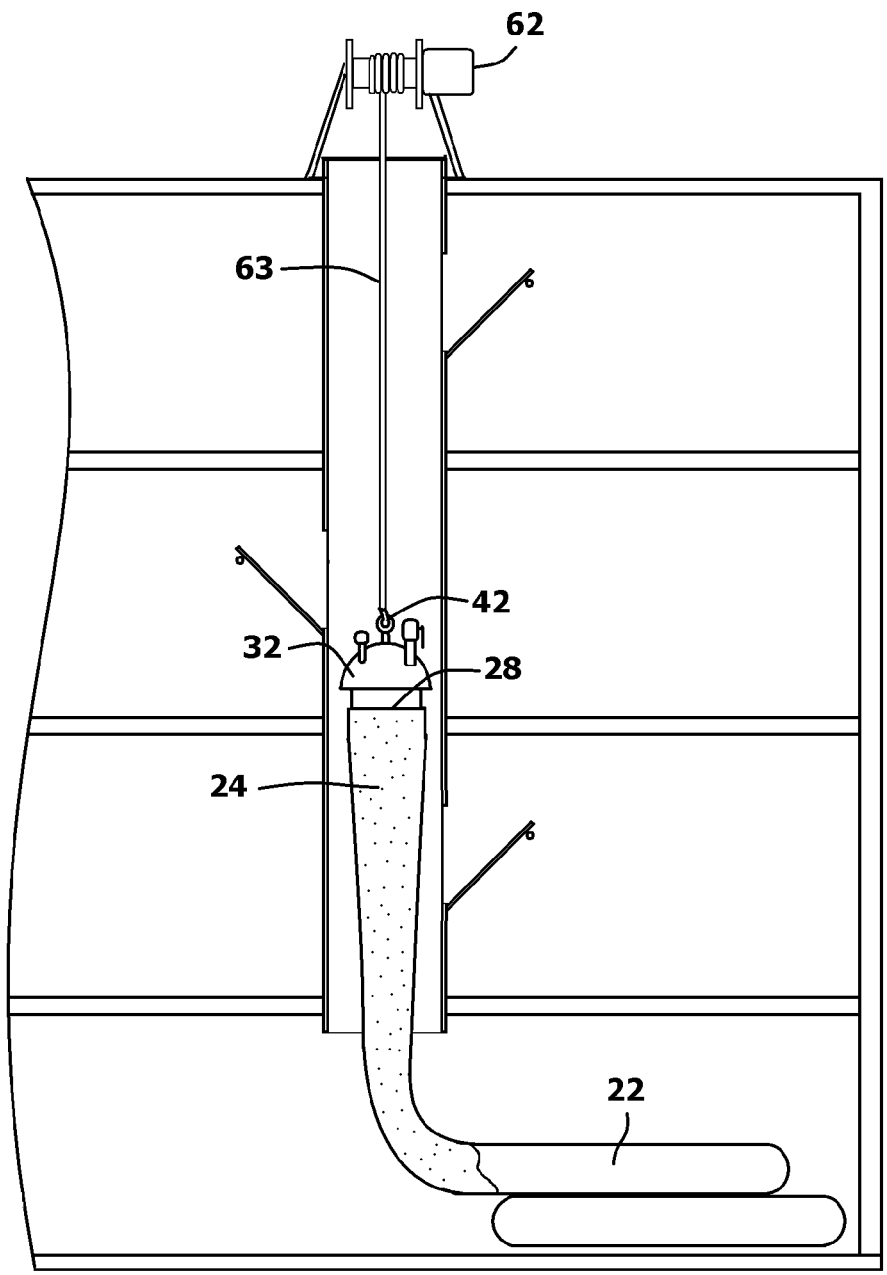
FIG. 4 shows the initial steps of applying the lining system of FIG. 2 to the exemplary trash chute of FIG. 1.

Referring to FIG. 4 in conjunction with FIG. 2, it can be seen that once the trash chute 12 is cleaned, the first open end 28 of the tubular fabric liner 22 is clamped onto the first plug assembly 32. The cable 63 is lowered into the basement 15 and the cable 63 is attached to the cable connector 42 on the first plug assembly 32. Using the winch 62, the cable 63 is retracted. This pulls the first plug assembly 32 and the first open end 28 of the tubular fabric liner 22 up through trash chute 12. As the tubular fabric liner 22 ascends into the trash chute 12, the protective film 26 is removed, therein exposing the heat activated resin 24 on the tubular fabric liner 22. As the tubular fabric liner 22 is pulled up through the trash chute 12, the tubular fabric liner 22 is collapsed and is much narrower than the trash chute 12. As a result, there is very little contact between the exterior of the tubular fabric liner 22 and the interior of the trash chute 12 as the tubular fabric liner 22 is winched up with the first plug assembly 32.

Figure 5:
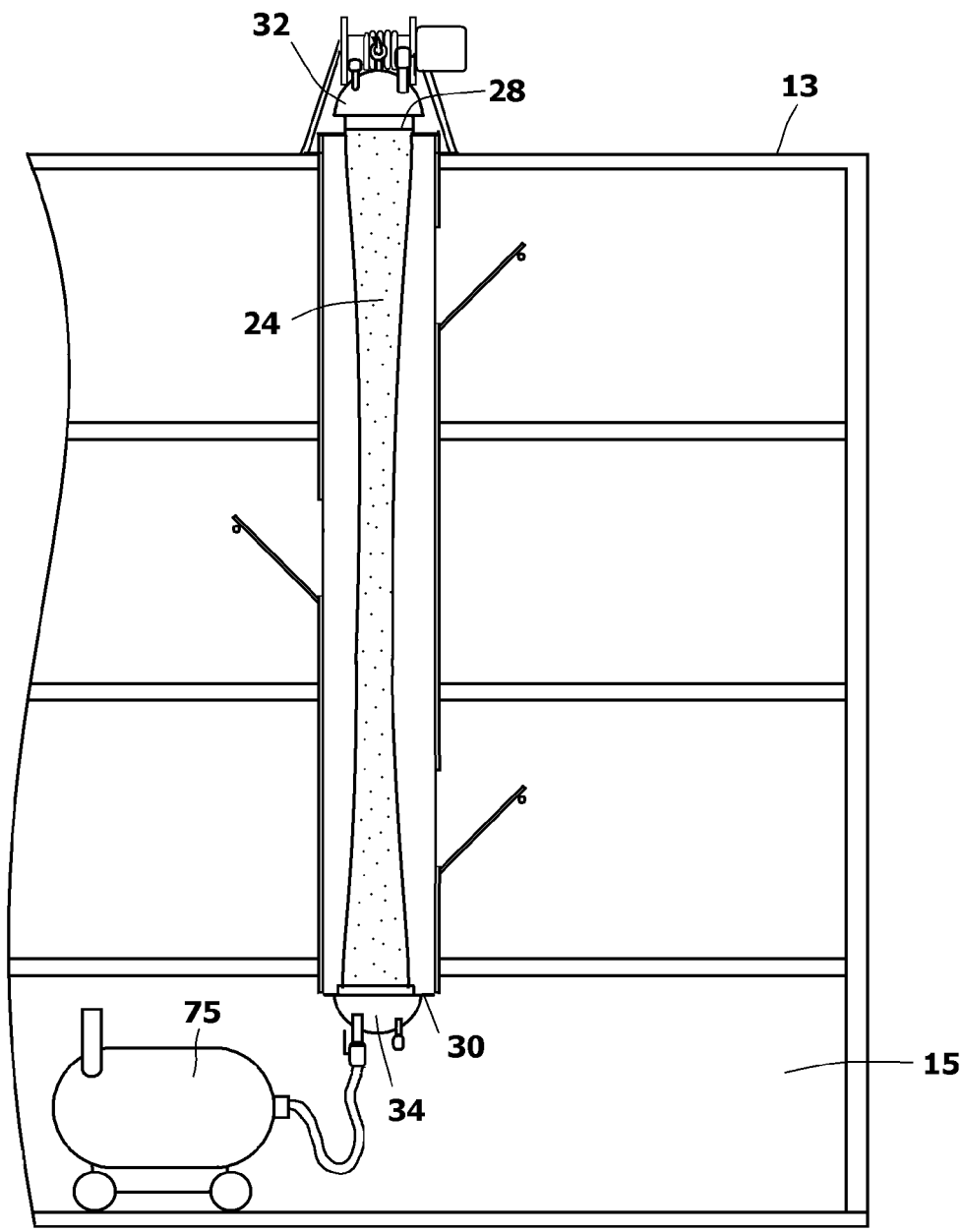
FIG. 5 shows the interim steps of applying the lining system of FIG. 2 to the exemplary trash chute of FIG. 1.

Referring to FIG. 5 in conjunction with FIG. 2, it can be seen that once the first plug assembly 32 and the first open end 28 of the tubular fabric liner 22 are winched higher than the roof 13, the second open end 30 of the tubular fabric liner 22 is suspended in the basement 15. If the tubular fabric liner 22 is too long or is fed from a reel, it can be trimmed at this time. The second plug assembly 34 is then clamped to the second open end 30 of the tubular fabric liner 22. As a result, the first and second open ends 28, 30 of the tubular fabric liner 22 are sealed and the tubular fabric liner 22 is ready for inflation.

Figure 6:
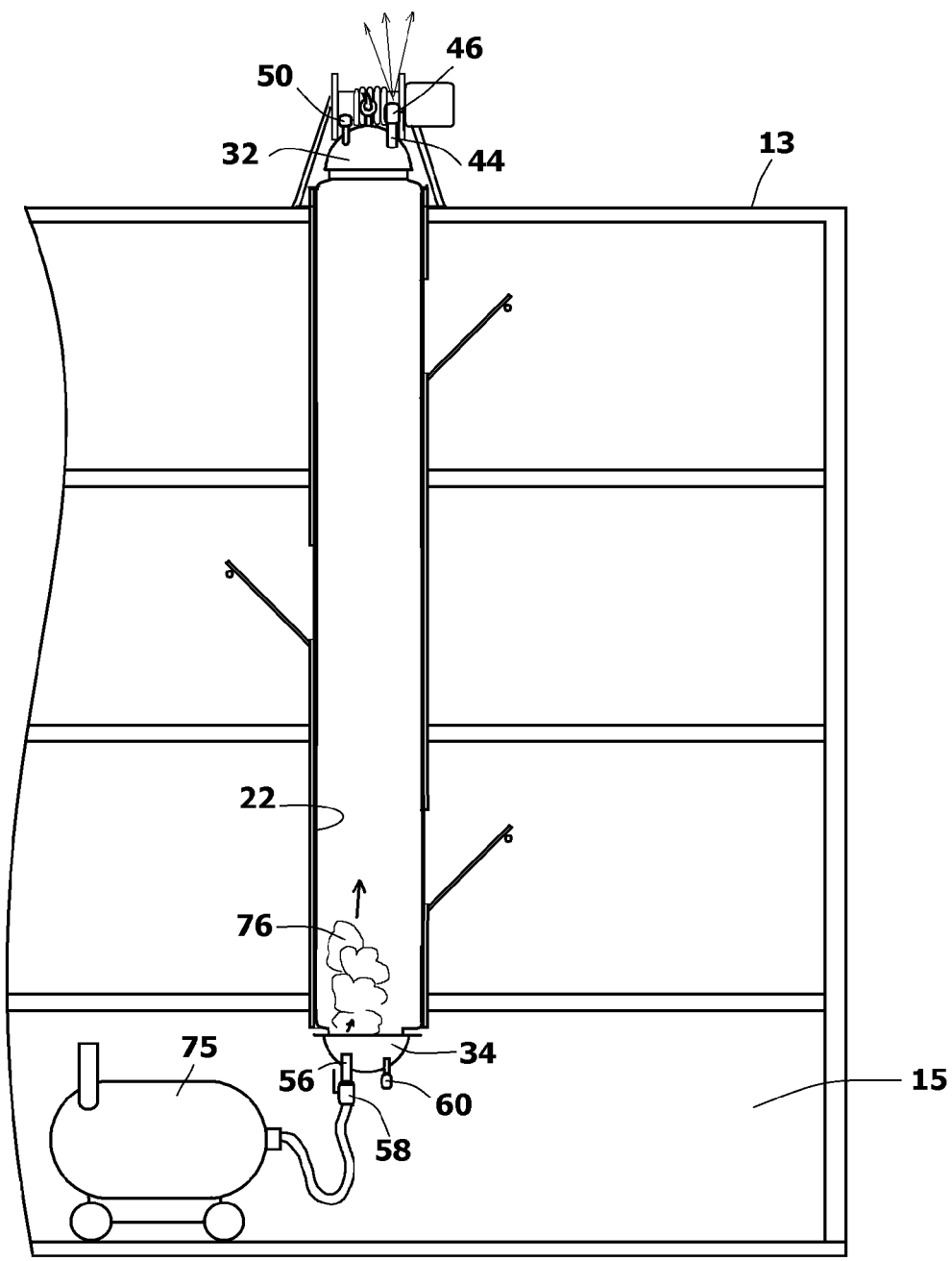
FIG. 6 shows some steps of applying the lining system of FIG. 2 to the exemplary trash chute of FIG. 1.

Referring to FIG. 6 and FIG. 5 in conjunction with FIG. 2, it will be understood that in order to inflate the tubular fabric liner 22, a commercial steam generation system 75 is connected to the steam port 56 in the basement 15 of the building 11. The steam generation system 75 produces steam 76. As the steam 76 enters the tubular fabric liner 22, the tubular fabric liner 22 inflates and expands. The exterior dimensions of the tubular fabric liner 22 are matched to the interior dimensions of the trash chute 12. As a consequence, the tubular fabric liner 22 is expanded against the interior of the trash chute 12 by the steam 76. The tubular fabric liner 22 is incapable of expanding to a size larger than the interior of the trash chute 12, provided the pressure of the steam 76 is reasonably managed.

The pressure of the steam 76 is managed using the various valves on the first plug assembly 32 and the second plug assembly 34. Steam 76 is introduced through the steam port 56 in the second plug assembly 34. The flow of the steam 76 is controlled by operating the fill valve 58 at the steam port 56. As the steam 76 enters the tubular fabric liner 22, any air within the tubular fabric liner 22 is displaced. The vent valve 46 on the vent pipe 44 in the first plug assembly 32 is opened to vent the displaced air. As the steam 76 enters the second open end 30 in the basement 15 of the tubular fabric liner 22, air is displaced toward the first open end 28 on the roof 13. Eventually all of the air is displaced through the first plug assembly 32 and the vent valve 46 is closed.

Once the vent valve 46 is closed, the tubular fabric liner 22 fully inflates with steam 76. The pressure relief valve 50 on the roof 13 in the first plug assembly 32 is set to a first venting pressure that is less than five PSI over ambient pressure. The second pressure relief valve 60 in the basement 15 in the second plug assembly 34 is set to a second venting pressure that is greater than the first venting pressure. The difference between the first venting pressure and the second venting pressure corresponds to the weight of the steam 76 in the tubular fabric liner 22, which can be substantial for long garbage chutes 12. In this manner the first pressure relief valve 50 on the roof and the second pressure relief valve 60 in the basement 15 will vent at the same time should the pressure of the steam 76 become excessive.

As the steam 76 fills and inflates the tubular fabric liner 22, the tubular fabric liner 22 is pressed against the interior of the trash chute 12. The steam 76 also compresses the tubular fabric liner 22, therein thinning the material of the tubular fabric liner 22. Simultaneously, the steam 76 heats the tubular fabric liner 22 to the temperature of the steam 76. This causes the heat activation resin 24 to cure. It also sterilizes the interface between the tubular fabric liner 22 and the trash chute 12. The steam 76 is supplied and vented to maintain a relative constant temperature and pressure within the tubular fabric liner 22. The pressure and temperature are maintained until the heat activated resin 24 is fully cured.

Figure 7:
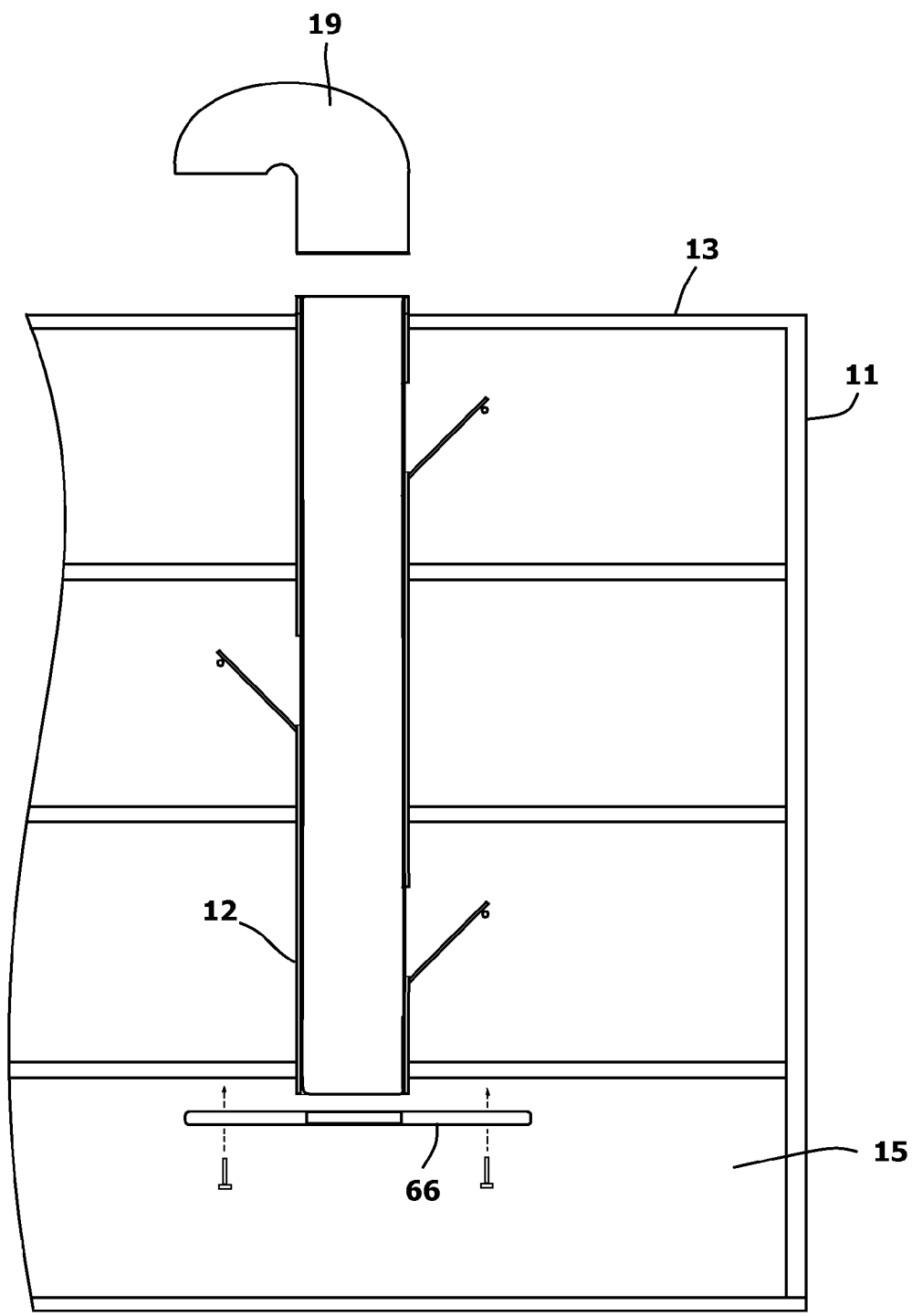
FIG. 7 shows the finishing steps of applying the lining system of FIG. 2 to the exemplary trash chute of FIG. 1.

The heat activated resin 24 hardens when cured, therein making the tubular fabric liner 22 rigid and hard after the resin 24 cures. As this point, the weight of the cured tubular fabric liner 22 is still being borne by the cable 63 of the winch 42. Referring to FIG. 7 in conjunction with FIG. 6 and FIG. 1, it can be seen that the second plug assembly 34 in the basement 15 is removed and the tubular fabric liner 22 is trimmed at the bottom of the trash chute 12. The support plate 66 is bolted or otherwise mounted to the ceiling in the basement 15 or any other rigid framework that may surround the bottom of the trash chute 12. The support plate 66 supports the tubular fabric liner 22 without obstructing the tubular fabric liner 22. The support plate 66 bears the weight of the tubular fabric liner 22 and transfers that weight to the building 11. In this manner, any brackets that were holding the trash chute 12 in place need not support the excess weight of the tubular fabric liner 22. With the support plate 66 in place, the cable 63 can be detached and the first plug assembly 32 removed. The cured tubular fabric liner 22 is trimmed on the roof 13 and the vent cover 19 replaced.

With the tubular fabric liner 22 cured and supported, openings can be cut into the tubular fabric liner 22 that align with the access openings 17 on each floor of the building 11. The trash chute 12 is now lined, cured, and supported. The trash chute 12 can again be used in its original manner. The lining of the trash chute 12 is faster, less labor intensive, less intrusive, and far less expensive than replacing and/or repairing sections of the trash chute 12.

If a trash chute 12 is particularly long, it may be desirable to prefill the tubular fabric liner 22 with air, prior to the injection of steam 76. By pre-inflating, the tubular fabric liner 22 with air, folds and buckles in the tubular fabric liner 22 can be eliminated prior to curing. Other adjustments can also be made to position the tubular fabric liner 22 around curves, protrusions and other obstructions that may exist within the trash chute 12. The air can be introduced through either the first plug assembly 32 or the second plug assembly 34, whichever is more convenient. Once the tubular fabric liner 22 is properly positioned, the air can be displaced with steam 76 in the manner previously described.

It will be understood that the embodiment of the present invention that is illustrated and described is merely exemplary and that a person skilled in the art can make many variations to those embodiments. For instance, the length, width, and cross-sectional geometry of the tubular fabric liner can be changed to accommodate different trash chutes. All such embodiments are intended to be included within the scope of the present invention as defined by the claims.

What is claimed is:

1. A method of lining an interior of a vertical trash chute, said method comprising:
   providing a tubular fabric liner having a first open end and a second open end, wherein said tubular fabric liner is infused with a resin;
   closing said first open end of said tubular fabric liner;
   pulling said first open end of said tubular fabric liner through said vertical trash chute to position said tubular fabric liner in said vertical trash chute;
   closing said second open end of said tubular fabric liner; and
   inflating said tubular fabric liner to cause said tubular fabric liner to press against said interior of said trash chute as said resin cures.

2. The method according to claim 1, wherein closing said first open end of said tubular fabric liner includes attaching a first plug to said first open end and closing said second open end of said tubular fabric liner includes attaching a second plug to said second open end.

3. The method according to claim 2, wherein inflating said tubular fabric liner includes inflating said tubular fabric liner with steam that is introduced into said tubular fabric liner through said second plug.

4. The method according to claim 3, further including venting said tubular fabric liner through said first plug as said steam is introduced into said tubular fabric liner until said steam reaches said first plug.

5. The method according to claim 3, further including proving a first pressure regulator on said first plug that prevents pressure within said tubular fabric liner from exceeding a first threshold pressure.

6. The method according to claim 5, further including providing a second pressure regulator on said second plug that prevents pressure within said tubular fabric liner from exceeding a second threshold pressure that is higher than said first threshold pressure.

7. The method according to claim 6, wherein said interior of said trash chute has a rupture pressure and both said first threshold pressure and said second threshold pressure are below said rupture pressure.

8. The method according to claim 1, wherein said resin is a heat activated resin and said method further includes heating said tubular fabric liner to cure said heat activated resin.

9. The method according to claim 8, wherein said tubular fabric liner is heated with steam.

10. The method according to claim 1, wherein inflating said tubular fabric liner includes filling said tubular fabric liner with air.

11. The method according to claim 2, wherein attaching a first plug to said first open end of said tubular fabric liner includes providing a first plug that can pass through said interior of said trash chute, inserting at least part of said first plug into said first open end of said tubular fabric liner, and clamping said tubular fabric liner to said first plug.

12. The method according to claim 2, wherein pulling said first open end of said tubular fabric liner through said vertical trash chute includes connecting a cable to said first plug and pulling said first plug up through said trash chute with said cable.

13. The method according to claim 1, wherein providing a tubular fabric liner includes proving a tubular fabric liner that is chemically treated with at least one antimicrobial compound.

* * * * *